(12) United States Patent
Mahaffey et al.

(10) Patent No.: US 11,832,772 B2
(45) Date of Patent: *Dec. 5, 2023

(54) PRODUCT USE ACOUSTIC DETERMINATION SYSTEM

(71) Applicant: Kimberly-Clark Worldwide, Inc., Neenah, WI (US)

(72) Inventors: Cleary E. Mahaffey, Canton, GA (US); Stephen Becker, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,723

(22) Filed: Jun. 14, 2022

(65) Prior Publication Data

US 2022/0304522 A1  Sep. 29, 2022

Related U.S. Application Data

(63) Continuation of application No. 16/893,539, filed on Jun. 5, 2020, now Pat. No. 11,369,236, which is a continuation of application No. 15/756,155, filed as application No. PCT/US2015/058195 on Oct. 30, 2015, now Pat. No. 10,709,300.

(51) Int. Cl.
| *A47K 5/12* | (2006.01) |
| *G01H 17/00* | (2006.01) |
| *A47K 10/32* | (2006.01) |
| *G01F 1/66* | (2022.01) |

(52) U.S. Cl.
CPC .............. *A47K 5/1217* (2013.01); *A47K 5/12* (2013.01); *A47K 10/32* (2013.01); *G01F 1/66* (2013.01); *G01H 17/00* (2013.01); *A47K 2010/3226* (2013.01)

(58) Field of Classification Search
CPC .. A47K 2010/3226; A47K 10/32; A47K 5/12; A47K 5/1217; G01F 1/66; G01H 17/00
USPC .................................................. 700/231–244
See application file for complete search history.

(56) References Cited

U.S. PATENT DOCUMENTS

| 7,856,289 B2 | 12/2010 | Schanin et al. |
| 10,373,477 B1 | 8/2019 | Bonner et al. |
| 11,369,236 B2 * | 6/2022 | Mahaffey ............. A47K 5/1217 |
| 2005/0080679 A1 | 4/2005 | Barton et al. |
| 2010/0102959 A1 | 4/2010 | Ashrafzadeh et al. |
| 2011/0232367 A1 | 9/2011 | McManus et al. |
| 2012/0212344 A1 * | 8/2012 | Forsberg ................ G16H 40/20 |
| | | 340/573.1 |
| 2013/0000337 A1 | 1/2013 | Krause et al. |
| 2013/0099900 A1 | 4/2013 | Pulvermacher |
| 2013/0099929 A1 * | 4/2013 | Ophardt ................ B05B 11/308 |
| | | 222/27 |

(Continued)

FOREIGN PATENT DOCUMENTS

| CA | 2739362 A1 | 11/2012 |
| CA | 2737012 C | 7/2018 |

(Continued)

*Primary Examiner* — Timothy R Waggoner
(74) *Attorney, Agent, or Firm* — Dority & Manning, P.A.

(57) ABSTRACT

Methods, systems and apparatus for determining product use by acoustically sensing actuations of product dispensers to determine how much product remains, and, optionally, alert a provider when low product states exist.

9 Claims, 5 Drawing Sheets

(56) References Cited

U.S. PATENT DOCUMENTS

2015/0238056 A1    8/2015  Fellhoelter
2019/0031157 A1    1/2019  Sun et al.

FOREIGN PATENT DOCUMENTS

| | | |
|---|---|---|
| CA | 2773801 C | 8/2019 |
| CA | 2790366 C | 10/2021 |
| CN | 101027701 A | 8/2007 |
| CN | 101810448 A | 8/2010 |
| CN | 202480311 U | 10/2012 |
| CN | 102871586 A | 1/2013 |
| CN | 103997939 A | 8/2014 |
| EP | 2511889 A2 | 10/2012 |
| JP | 2003242230 A | 8/2003 |
| JP | 2005305123 A | 11/2005 |
| KR | 20090021921 A | 3/2009 |
| WO | 2006026102 A2 | 3/2006 |
| WO | 2008034446 A2 | 3/2008 |
| WO | 2010026581 A2 | 3/2010 |

\* cited by examiner

PRODUCT USE ACOUSTIC DETERMINATION SYSTEM

The present application is a continuation application of and claims priority to and benefit of U.S. patent application Ser. No. 16/893,539, filed on 5 Jun. 2020, which claims priority to and benefit of U.S. patent application Ser. No. 15/756,155, filed on 28 Feb. 2018, which claims priority to and benefit of PCT/US15/58195, filed on 30 Oct. 2015, the contents of which are all incorporated herein by reference.

TECHNICAL FIELD

This disclosure relates to determining use of consumable products, equipment and/or systems through acoustic analyses.

Systems dispensing consumable products are ubiquitous in many environments today. For example, hand towel dispensers are commonplace in many semi-private and public washrooms and break rooms. Monitoring and refilling such dispensers can be a time consuming and laborious endeavor requiring, in some scenarios, that an attendant or building maintenance team member routinely check the dispensers and refill as needed. This process inevitably results in checking the dispenser and determining that no refill is required, resulting in an unnecessary visit to the dispenser, which leads to building management inefficiencies and additional costs.

This process, including such unnecessary visits, is magnified given that many environments include multiple dispensers, for example, one washroom may include numerous hand towel, bath tissue and hand soap dispensers, and that there can be dozens of washrooms in a commercial building spread across many different floors.

Some systems have been introduced that remotely monitor dispensers, through RF communications, to determine when the dispensers need to be refilled. However, such systems often require the installation of new dispensers with RF communication capability, which can be an expensive proposition.

SUMMARY OF THE DISCLOSURE

In general, the subject matter of this specification relates to using acoustic signals and acoustic analysis to determine product usage in dispensers and, more generally, maintenance and use conditions for equipment and devices.

In general, one aspect of the subject matter described in this specification can be implemented in systems that include one or more dispensing devices, each dispensing device having a consumable product storage area and a dispensing mechanism coupled to the product storage area. Each dispensing device is configured to store a respective consumable product in the product storage area and to dispense the consumable product through use of the dispensing mechanism to facilitate a hygiene-based process. Actuation of each dispensing device creates an acoustic signal. The systems can also include an acoustic sensing module configured to sense one or more acoustic signals based on actuation of the one or more dispensing devices and to determine, on a per dispensing device basis, which of the one or more dispensing devices were actuated based on the sensed one or more acoustic signals; and a data collection device configured to communicate with the acoustic sensing module to store data describing the one or more dispensing devices determined to have been actuated. Other embodiments of this aspect include corresponding methods, apparatus, and computer program products.

Yet another aspect of the subject matter described in this specification can be implemented in methods that include sensing acoustic signals in a washroom or break room, where each acoustic signal is generated by actuation of a corresponding dispensing device in the washroom and each acoustic signal is different from each other acoustic signal; in response to sensing an acoustic signal, determining which dispensing device actuated based on a comparison of the sensed acoustic signal to predetermined acoustic signatures of actuating dispensing devices; determining, for at least one of the dispensing devices, a number of actuations of the at least one dispensing device; determining, for the at least one of the dispensing devices, whether a use state of a consumable product in the at least one dispensing device is in a depletion range based on the determined number of actuations; and in response to determining the at least one dispensing device is in the depletion range, generating a depletion alert. Other embodiments of this aspect include corresponding systems, apparatus, and computer program products.

A further aspect of the subject matter described in this specification can be implemented in methods that include installing an acoustic sensing module in an environment having existing dispensing devices; training the acoustic sensing module to individually identify the dispensing devices based on acoustic signals generated by actuations of the dispensing devices; determining numbers of actuations of the dispensing devices based on the training; monitoring the dispensing devices to determine low consumable product states in the dispensing devices based on the number of actuations for the dispensing devices; and generating alert messages in response to determined low consumable product states. Other embodiments of this aspect include corresponding systems, apparatus, and computer program products.

In some implementations, the methods, systems, apparatus, and computer program products described herein have the following features, including one or more dispensing devices, where each includes an acoustic signal generator to generate the acoustic signal in response to actuation of the dispensing mechanism. The acoustic signal is an ultrasonic or subsonic signal. The acoustic sensing module is configured to generate and transmit a low consumable product alert for a given dispensing device based on an analysis of a number of determined actuations for the given dispensing device and a number of actuations corresponding to a threshold depletion level of the consumable product.

The acoustic sensing module includes a plurality of acoustic sensors configured to be positioned remote from each other, and where the acoustic sensing module is configured to determine, on a per dispensing device basis, which of the one or more dispensing devices were actuated based on when in time the sensed one or more acoustic signals were received by various of the plurality of acoustic sensors. The acoustic sensing module is configured to sense an acoustic signal indicative of at least one of the dispensing devices opening or closing and to reset a number of determined actuations for the at least one of the dispensing devices.

The acoustic sensing module is configured to sense an acoustic signal indicative of at least one of the dispensers actuating without dispensing a consumable product, and to generate and transmit an alert in response sensing. The acoustic sensing module is configured to detect a door opening event and only sense the one or more acoustic signals within a predetermined time period of the door opening event. The acoustic sensing module is configured to access acoustic signatures (e.g., from the memory storage device) corresponding to the one or more acoustic signals and to determine, on a per dispensing device basis, which of the one or more dispensing devices were actuated based on the sensed one or more acoustic signals and the acoustic signatures. The acoustic sensing module is configured to sense an environmental signal and to determine an actuation of a given dispensing device only in response to sensing (i) the acoustic signal for the given dispensing device and (ii) the environmental signal within a predetermined time period of each other. The environmental signal is an acoustic signal of water running or a door opening.

The acoustic sensing module is configured to sense an acoustic signal indicative of water running and, in response to the acoustic signal occurring continuously for at least a predetermined duration, generate and transmit a maintenance alert. The one or more dispensing devices include a paper towel dispenser, a bath tissue dispenser or a hand soap dispenser. The consumable product includes paper towels, bath tissue or hand soap Particular embodiments of the subject matter described in this specification can be implemented so as to realize one or more of the following advantages. For example, the status of existing dispensers, including the status of consumable products in the dispensers (e.g., need to be refilled or at an acceptable level, consumable product remaining), and other equipment or devices in an environment can be monitored without having to install new dispensers with dedicated communication components and functionality because the technology described herein can monitor existing devices based on their innate acoustics and/or unique acoustic characteristics. Thus the technology described herein does not require a costly change-out of existing dispensers to monitor and manage service conditions including product refilling and other maintenance events. Further, by using acoustics to monitor and manage the dispensers and other equipment, complex RF-type communication systems can be avoided.

In some implementations, the acoustic system will identify dispenser use based on unique acoustic signals indicative of dispenser actuation from simple acoustic generators added to the dispensers. Such acoustic signals can be selected to be in targeted frequency ranges (e.g., low noise frequency bands and/or to avoid interference from human speech) to increase the effectiveness of the acoustic system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION OF THE DISCLOSURE

The present disclosure relates to determining dispensing device use and, thereby, product consumption based on the acoustics of the dispensing device's actuation (e.g., the sounds generated by actuation of the dispensing device to dispense product). For example, a dispensing cycle of a hand towel dispenser provides a predetermined length of hand towel roll to a user. Given this known length and the number of dispense actuations (e.g., by acoustically sensing the sound of the actuation), the amount of towel roll used and/or remaining in the dispenser can be determined. Based on this knowledge, decisions can be made as to when the roll will be exhausted and therefore when the dispenser needs to be refilled to avoid an empty state and a user not having access to towels. Knowing the depletion state of the hand towel roll also avoids unnecessary trips by maintenance personal to physically check the roll state, e.g., manually checking a dispenser in a washroom.

Such a sensing system operates without need of special dispensers with wired or wireless (e.g., RF or optical) communication systems or other costly and/or complex communication or notification components. This allows the acoustic sensing system, for example, to be installed in an environment and operate with existing dispensers that do not have communication capability, including without the need to retrofit the devices with such capability.

Further, the acoustic sensing system can monitor maintenance states or conditions of other equipment or devices in the environment. For example, the sensing system can sense the sound of continuous water flow in a washroom as an indicator of a potential running bathroom toilet or a water faucet left on. The acoustic sensing system is described in additional detail below.

Figure 1:
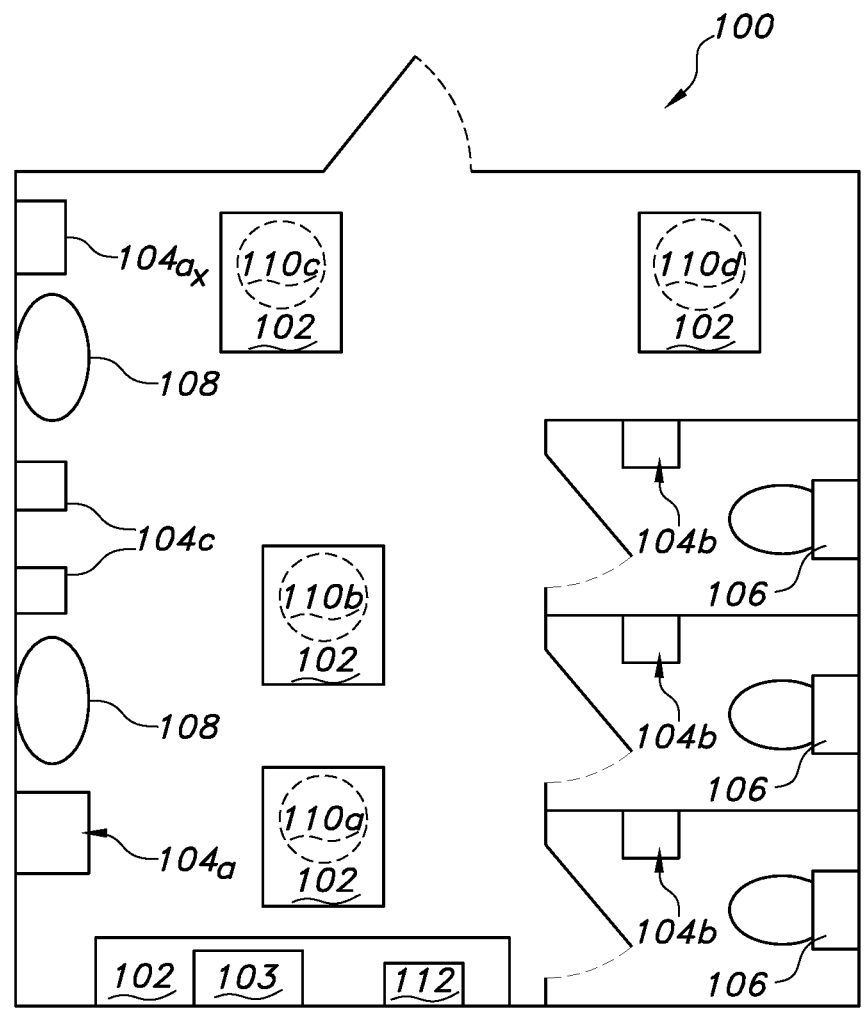
FIG. 1 is a block diagram of an example environment in which an acoustic sensing system can be implemented.

FIG. 1 is a block diagram of an example environment 100 in which an acoustic sensing system 102 can be implemented. The environment 100 can be, for example, a semi-private or public washroom or break room or another space in which dispensers 104 and, optionally, equipment such as toilets 106 and/or sinks 108, are located. The dispensers 104 can include, for example, hand towel dispensers 104a, bath tissue dispensers 104b, hand soap (or other cleansing) dispensers 104c, hand or facial care dispensers (not pictured), and the like. In some implementations, all of the dispensers 104 are hygiene-based dispensers, and the acoustic sensing system 102 only monitors dispensers, e.g., senses dispenser acoustics such as actuation sounds. In some implementations, the sensing system 102 monitors multiple devices and equipment including dispensers 104, toilets 106 and sinks 108.

In some implementations, the acoustic sensing system 102 includes or is in data communication with one or more acoustic sensors 110 positioned in the environment 100 and remote from the acoustic sensing module 103. Each acoustic sensor 110 is a device that detects surface acoustic (i.e., mechanical) waves/signals in the environment 100. For example, an acoustic sensor 110, such as a microphone or other transducer, can detect the amplitude, phase, and/or frequency of acoustic waves, and changes therein, and, optionally, generate an electrical signal (or signals) corresponding to the acoustic wave that can be communicated (e.g., through wireless channels such as BLUETOOTH or WI-FI technologies) to the acoustic sensing module 103. In turn, acoustic sensing module 103, optionally, can process and communicate the acoustic information to data collection device 112, e.g., through wired or wireless channels or some combination thereof. The data collection device 112 can be local or remote to the acoustic sensing module 103 (e.g., in a cloud-based environment). The sensors 110 can be positioned, for example, on the ceiling and/or walls of the environment 100, and can have a transmitter or transceiver (wireless or wired) to transmit the sensed acoustic signals to the acoustic sensing module 103.

In some implementations, each acoustic sensor 110 is a highly directional microphone that is targeted at a specific dispensing device 104 or piece of equipment 106, 108 such that the sensor 110 only (or primarily) picks up sound from that device 104 or equipment 106, 108. In this way noises and sounds in the environment 100, other than those from the targeted device/equipment, including speech are not sensed by the system 102. Reducing the effects from other environmental noises can increase the effectiveness of the system 102 as only the acoustic signals of interest are targeted for sensing.

In some implementations, the acoustic sensing module 103 locally processes the acoustic signals to determine the occurrence of an environmental event, e.g., a particular dispenser actuation, by comparing the sensed or acquired acoustic signal to known acoustic fingerprints or signatures of various dispensing device (and/or equipment) actuations or other events until the acoustic signal is matched to a known fingerprint. In this way, the acoustic sensing module 103 can identify which dispenser actuated and, hence, which consumable product was dispensed and used. The operation of the acoustic sensing module 103 is described in more detail below with reference to FIG. 2.

Figure 2:
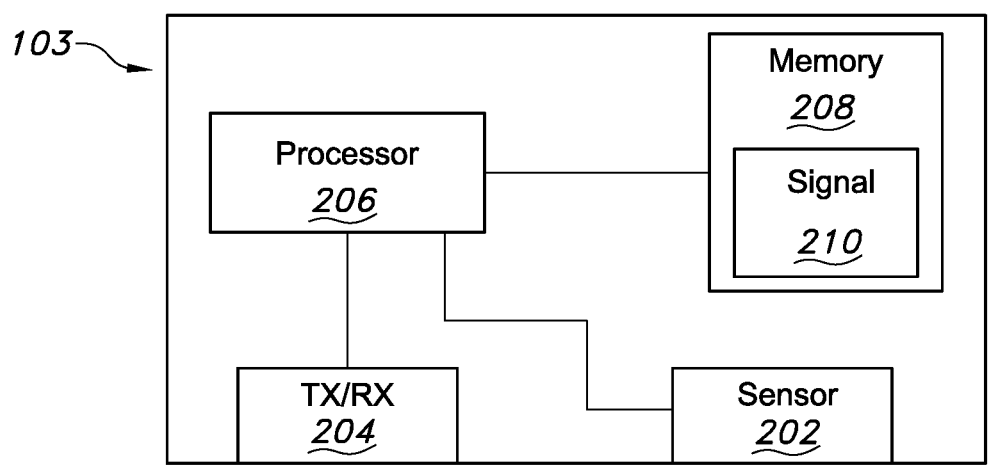
FIG. 2 is a block diagram of an example acoustic sensing system.

FIG. 2 is a block diagram of an example acoustic sensing module 103. Generally, the acoustic sensing module 103 senses or acquires (e.g., from the acoustic sensors 110) acoustic signals from devices 104 and equipment 106, 108 in the environment 100 to identify environmental events such as, for example, a paper towel dispense, soap dispense, toilet flush and faucet actuation. The sensing module 103 can do this through use of a local acoustic sensor 202, through use of the remote acoustic sensors 110, or both.

In some implementations, the acoustic sensing module 103 also includes a processor 206 (e.g., a data processing apparatus), transceiver 204, and a memory storage device 208. The transceiver 204, at the direction of the processor 206, communicates with the acoustic sensors 110 to acquire data describing the acoustic signals sensed by the sensors 110, for example, for use in processing the signals against known fingerprints to identify device actuations or equipment conditions or states (e.g., running toilet condition that requires maintenance). In some implementations, the sensors 110 communicate to the transceiver 204 periodically (e.g., every five seconds), on an ad hoc basis as signals are sensed, and/or in response to polling by the acoustic sensing module 103. In some implementations, the transceiver 204 communicates with the sensors 110 through a wireless or wired communication channel.

The memory storage device 208 can store programmatic instructions to control the operation of the acoustic sensing module 103 (and/or the system 102) as well as store data describing the acoustic signals sensed by the sensors 202, 110. Further, the memory storage device 208 stores acoustic signatures/fingerprints 210, for example, of various sounds indicative of actuation and/or other operational or maintenance characteristics of the dispensers 104, equipment 106, 108, the environment 100, or a combination thereof. The acoustic sensing system 102, for example, uses these signatures 210 to determine and/or forecast dispenser product usage, dispenser product refill needs, and/or dispenser and equipment maintenance states (e.g., needs servicing).

An acoustic signature 210 is a signal particularly (e.g., uniquely or quasi-uniquely) representing a sound (e.g., acoustic wave), for example, from a dispenser 104 or equipment 106, 108. More particularly, an acoustic signature 210 is an acoustic signal that can be discerned from other acoustic signals (e.g., in the environment 100 or, in some implementations, more specifically, the washroom) within some confidence interval such as 90 or 95 percent. In some implementations, each respective acoustic signature 210 represents the sound of a dispenser 104 or equipment 106, 108 (e.g., at a point in time or over some duration) operating or in a maintenance condition such as a running toilet or faucet or a broken dispenser mechanism. For example, with respect to a given dispenser 104, an acoustic signature 210 for that dispenser 104 is the sound of the dispenser 104 actuating (e.g., dispensing its product).

In some implementations, a given dispenser 104 or piece of equipment 106, 108 may have multiple acoustic signatures. For example, a towel dispenser 104 may have an acoustic signature for dispensing a towel, an acoustic signature for dispensing without providing a towel (e.g., the dispenser is empty), an acoustic signature for a common failure in the dispenser mechanism, an acoustic signature for opening the dispenser (e.g., to refill), and an acoustic signature for closing the dispenser (e.g., after a refill). An acoustic signature 210 can be a point in time representation of a sound or a representation capturing some duration of the sound (e.g., 1, 5, 10 or 20 seconds). In some implementations, an acoustic signature is bounded to a predetermined frequency, time, and/or amplitude range.

Figure 3A:
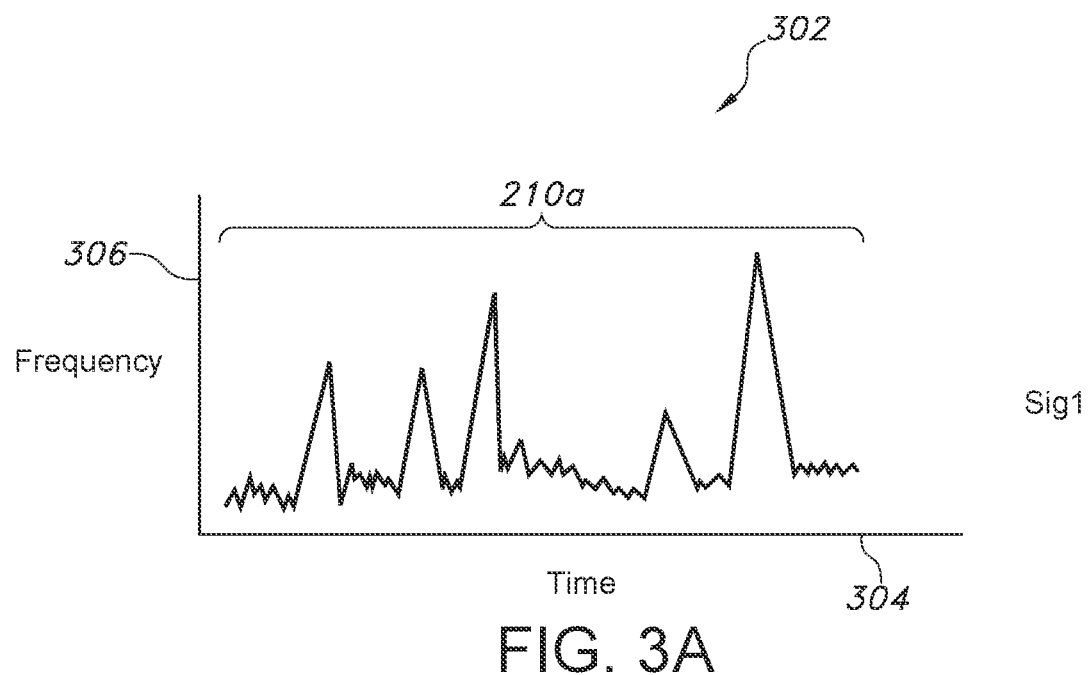
FIGS. 3A and 3B are graphs representing example acoustic signatures.
Figure 3B:
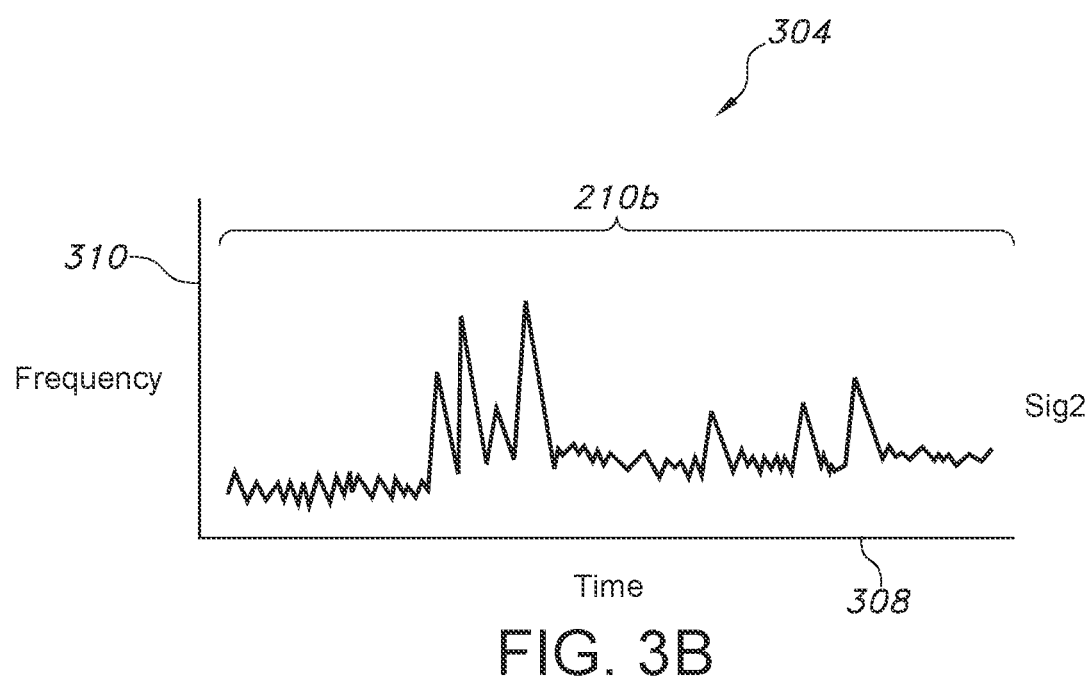

Each signature 210 can be, for example, visually described through a graph. Such a graph can include a horizontal axis representing time, a vertical axis representing frequency and a third dimension representing the amplitude of a given frequency at a particular point in time (e.g., as shown by an intensity or color of each point in the graph). FIGS. 3A and 3B are graphs (e.g., spectrograms) representing example acoustic signatures 210. More specifically, these figures are two-dimensional graphs representing acoustic signatures 210. FIG. 3A is a graph 302 of an acoustic signature 210a showing time on the horizontal axis 304 and frequency on the vertical axis 306 and represents, for example, a towel dispenser 104 dispensing a paper towel. FIG. 3B is a graph 304 of an acoustic signature 210b showing time on the horizontal axis 308 and frequency on the vertical axis 310 and represents, for example, a bath tissue dispenser 104 dispensing bath tissue (e.g., through a manual pull of the bath tissue).

In some implementations, the acoustic signatures 210 are generated by an in-situ environmental process. For example, for a particular environment 100, environmental event sounds (e.g., operation and maintenance conditions) of the dispensers 104 and equipment 106, 108 are recorded to account for the acoustics of the environment 100, noise from environmental events of other devices in the environment 100, noise from speech (which can be filtered out before processing), and/or other background noises. In some implementations, the acoustic signatures 210 are generated under controlled conditions to capture only the sound corresponding to the signature 210. For example, for an acoustic signature 210 for a dispenser 104 dispensing a towel, only (or primarily) the sound from the dispensing process is captured in the signature 210. This acoustic generation process can be performed prior to deploying the acoustic sensing system 102 in the environment 100, during or after the deployment process, or some combination thereof, and stored in memory 208.

In some implementations, the system 102 can provide reconfiguration instructions to the module 103, dispensers 104, and/or sensors 110 (or other parts of the system 102) to change the operation or state of the module 103, dispensers 104 and/or sensors 110. For example, such instructions can be firmware updates to change the function and/or performance of the module 103, instructions to reset the module 103 to a base state, change operating parameters of the dispensers 104 (e.g., reset product usage counters), and poll the module 103, dispensers 104 and/or sensors 110 to request data describing the state or status of the module 103, dispensers 104 and/or sensors 110.

Figure 4:
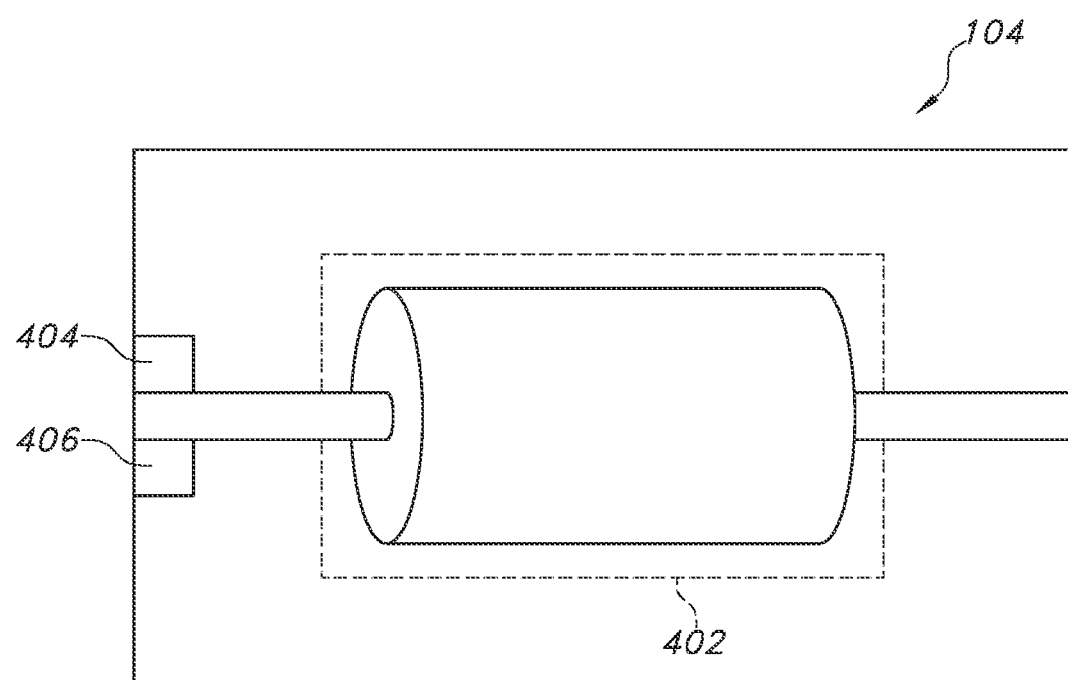
FIG. 4 is a block diagram of an example dispensing device.

FIG. 4 is a representation of an example dispensing device 104. A dispensing device 104 includes, for example, a hand towel dispenser, bath tissue dispenser, hand soap dispensers, a hand or facial care dispenser (e.g., a moisturizer dispenser), air freshener, odor sterilization device, to name a few. In some implementations, the dispensing device 104 includes a consumable product storage area 402 a dispensing mechanism 404 operatively coupled to the product storage area 402 to dispense the product to facilitate a hygiene-based process (e.g., hand washing, drying or moisturizing, odor sterilization or mitigation (for example, through an air freshener), or other environmental hygiene events). The consumable product storage area 402 is an area (e.g., cavity or opening) in which the product to-be-dispensed (e.g., consumable product) by the dispensing device 104 is located and/or stored for use. The consumable product storage area 402 can be completely or only partially enclosed within the dispensing device 104. The dispensing mechanism 404 is a mechanism that facilitates dispensing of the consumable product for use by a use. In some implementations, the dispensing mechanism 404 and the consumable product storage area 402 can be combined within the dispensing device 104.

In some implementations, the dispensing mechanism 404 is a device that allows a user to manually dispense the consumable product, e.g., by pulling on a portion of the consumable product or turning a twist dial or knob to cause a dispense operation/actuation. In some implementations, the dispensing mechanism 404 is an automated (e.g., electro-mechanical) device that advances or otherwise dispenses or aids in the dispensing of the consumable product. For example, in response to a slight tug on a paper towel partially exposed from beneath the dispensing device 104 or in response to detecting motion proximate the dispensing device 104 (e.g., through an infrared motion sensor), the dispensing mechanism 404 actuates to automatically advance or otherwise dispense the consumable product to the user. In the case of a hand soap dispenser, for example, the dispensing mechanism 404 may be a manual or power operated pump-type device. Regardless of whether the actuation of the dispenser mechanism 404 is manual or automated (or partially automated), the actuation creates an acoustic signal 210 or signature (e.g., sound), that as discussed above, can be used to identify or help identify a dispensing operation.

In some implementations, the dispensing device 104 includes an acoustic signal generator 406 to generate an acoustic signal 210 in response to actuation of the dispensing mechanism 404. For example, the acoustic generator 406 can be a device that senses or is triggered by actuation of the dispensing mechanism (or consumable product movement), and, in response, generates a tuned acoustic signal 210 for sensing by the system 102. Such a tuned acoustic signal 210 can be a specific chirp or beep or other sound, e.g., waveform in a particular frequency range, that is expected to be unique (or uncommon or otherwise promote identification) in the environment 100 to aid identification of the sound.

In some implementations, the acoustic signal generator 406 is, for example, a mechanical device or an electromechanical device that is actuated or triggered by physical movement associated with the dispensing device 104 (e.g., from the dispensing mechanism 404 or consumable product). For example, the acoustic signal generator 406 is a resilient member (e.g., metallic tab or finger) that slides across or otherwise engages the dispenser mechanism 404 as it actuates (or contacts the consumable) to help create the acoustic signal. By way of another example, the acoustic signal generator 406 is an electronic tone or sound generator device that is triggered to emit a particularly sound by physical movement of dispensing mechanism 404 or consumable product.

The acoustic signal generator 406 can be retrofit to existing dispensers 104 and equipment 106, 108 in an environment 100, or included in new dispensers 104 and equipment 106, 108. As mentioned above, each acoustic signal generator for each respective dispensing device 104/equipment 106, 108 can be configured to emit a sound/acoustic wave that can be used to particularly identify its dispensing device 104/equipment 106, 108. For example, the acoustic signal generators 406 for device X, equipment Y and device Z, respectively, can generate a tone at 25,000 Hertz at a constant amplitude for two seconds, a time varying frequency signal with a time varying amplitude for three seconds, and a 2 Hertz (subsonic) signal for 5 seconds.

In some implementations, the acoustic signal generator 406 is a programmable sound generator (e.g., based on Field Programmable Gate Array integrated circuit). Regardless of the particular implementation of the acoustic signal generator 406, the sound can be generated such that it can be easily filtered or otherwise separated from human speech (e.g., by selecting an acoustic waveform that is different from waveforms typically associated with human speech), limited to certain frequency ranges (e.g., ultrasonic and/or subsonic), and/or promotes identification from other environmental sounds from other devices 104 and equipment 106, 108. In this way, in some implementations, undesired noise, e.g., speech, does not make it into the system 102 because it is filtered out before any processing is performed.

As described above, in some implementations, an acoustic signal generator 406 can be coupled to a piece of equipment 106, 108. For example, with respect to a water faucet, the acoustic signal generator 406 can be an impeller-based device that couples to the faucet outlet and spins in response to water flow. The sound of the impeller spinning can be the acoustic sound or the spinning impeller can power an electrical or electromechanical component to generate the acoustic sound. In some implementations, if the acoustic sensing module 103 senses the acoustics from the impeller for a period of time that exceeds a predetermined threshold (e.g., fifty percent longer than a typical hand washing process), the acoustic sensing module 103 can indicate a maintenance condition is occurring (and generate a maintenance alert) such as a faucet left on or a leaking faucet.

Figure 5:
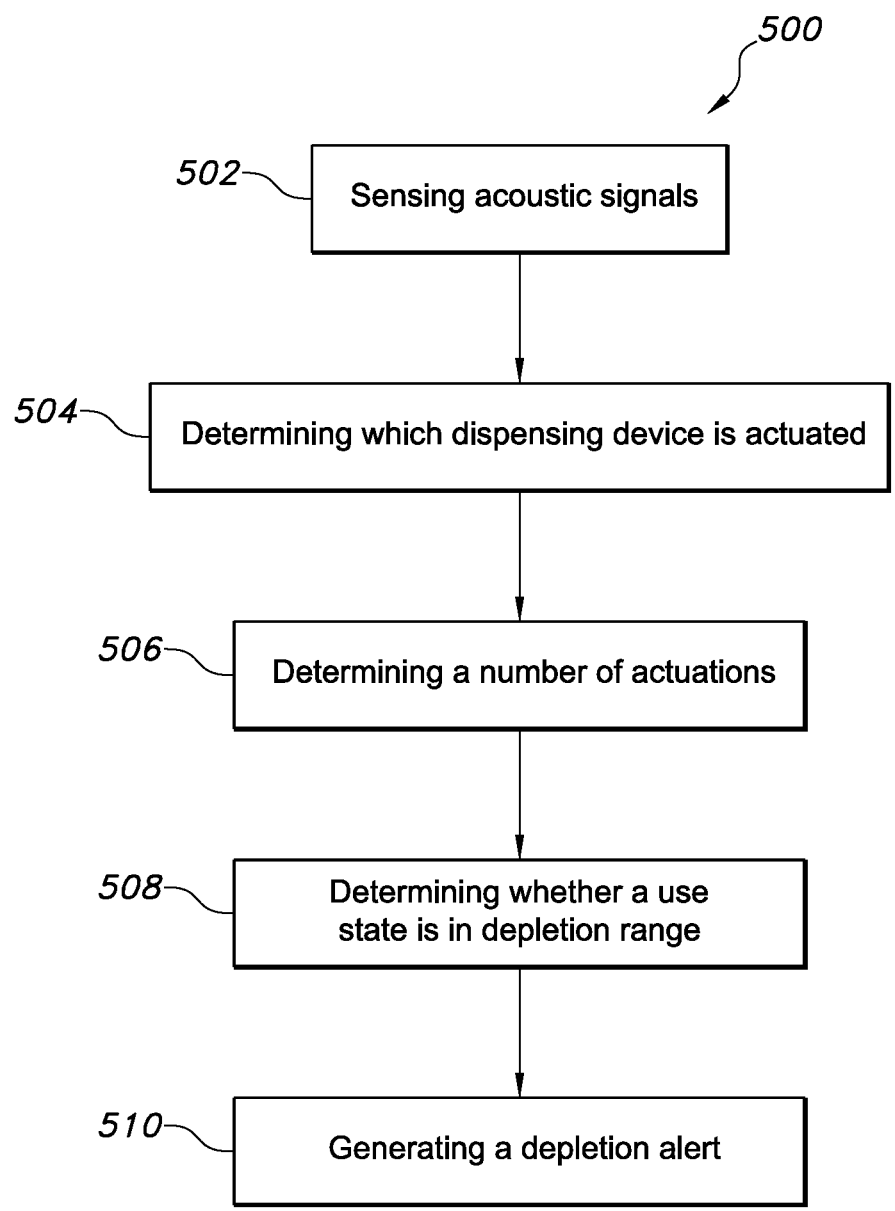
FIG. 5 is a flow chart of an example process for determining product usage and generating corresponding alerts.

FIG. 5 is a flow chart of an example process 500 for determining product usage and generating corresponding alerts. The system 102 can, for example, perform the steps described with reference to FIG. 5.

Acoustic signals in a washroom are sensed (502). For example, the acoustic sensing module 103 can sense acoustic signals. Each acoustic signal (e.g., sound) is generated by actuation of a corresponding dispensing device 104 in the washroom, whether through sounds naturally produced by the device 104 or through an acoustic signal generator 406. In some implementations, each acoustic signal 210 is different from each other acoustic signal 210, for example, to promote individual identification of the acoustic signals.

In response to sensing an acoustic signal, determining which dispensing device actuated based on a comparison of the sensed acoustic signal to predetermined acoustic signatures of actuating dispensing devices (504). In some implementations, the acoustic sensing module 103 determines which dispensing devices 104 actuated by sensing any acoustic signals 210 from the devices 104, whether through sensor 202 and/or sensors 110, and comparing those signals 210 with the signatures stored in memory 208 to look for matches. A match, for example, can be a similarity determination between the sensed and stored signature within some predefined range or above a predefined threshold, e.g., above 80 percent similarity between the signals and signature. Such a determination can be made through use of, for example, pattern matching algorithms or techniques, principal component analysis, feature vector analysis, Hidden Markov Model analysis, and/or the like.

In some implementations, the matching and other processing steps can be handled remotely by cloud or offsite systems, where the acoustic sensing module 103 acts as a router or link in the communication chain to such cloud or offsite systems. Further, such cloud or offsite systems can process data from multiple environments 100 in a building (e.g., each environment 100 or building serviced by a respective system 102 and/or module 103) and/or multiple environments 100 in multiple buildings or campuses (e.g., each environment 100 or building serviced by a respective system 102 and/or module 103). In this way the cloud or offsite systems can analyze the data to discern holistic information across multiple environments 100. In some implementations, each acoustic sensor 110 includes functionality to match the sensed acoustic signals to the corresponding known acoustic signatures and transmit data describing the match to the acoustic sensing module 103.

For at least one of the dispensing devices, a number of actuations of the at least one dispensing device is determined (506). In some implementations, the acoustic sensing module 103 determines the number(s) of actuations of the dispensing device 104. For example, the acoustic sensing module 103 determines the number of actuations of a dispensing device 104 (or a piece of equipment 106, 108) by counting the number of actuations of the dispensing device 104 (or a piece of equipment 106, 108) over a given period, for example, since the last refill for the dispensing device 104. For each dispensing device 104, the event of a sensed actuation can be stored in the memory 208 as a function of time or simply a running total that can be rest after a refill. The memory 208 can be manually reset by a custodian after a refill event or the sensing module 103 can sense the acoustic signal(s) indicative of the opening and/or closing of the dispensing device 104, e.g., opening or closing a lid to access the product storage area for a refill, as a trigger to reset the actuation counter to a base state such as zero. As described above, this step can be performed by a cloud or offsite system.

In some implementations, the acoustic sensing module 103 determines, on a per dispensing device basis, which of the dispensing devices was actuated based on when in time acoustic signals were received and/or sensed by various of the differently located acoustic sensors. With reference to FIG. 1, there may be multiple of the same dispensing device 104 (e.g., 104a) and equipment (e.g., 106). In some implementations, these multiple devices may generate the same or similar actuation sounds (e.g., acoustic signals). To differentiate and specifically identify which device 104 actuated, the sensors 110 record not only that a particular acoustic signal was sensed but also the time at which it was sensed. In this way the acoustic sensing module 103 processes this data from the sensors 110 and through techniques such as triangulation and time of flight calculations determines which dispensing device 104 actuated.

By way of an example, assume sensor 110c is closest to dispensing device 104ax and that dispensing device 104ax actuated and emitted, as a point source (and discounting effects such as echoes and scattering), an acoustic signal that was sensed by all sensors 110. Based on the sensed data received from the sensors 110, the acoustic sensing module 103 can determine that sensor 110c sensed the acoustic signal first in time. In turn, the acoustic sensing module 103 can determine, based on a pre-programmatically defined map of (and/or a logic chart for) the environment 100, including, for example, spatial orientation and positioning of the various dispensing devices 104, sensors 110, and equipment 106, 108, that sensor 110c is closest to dispensing device 104ax. Thus, based on the layout of dispensing devices 104 in the environment 100, and that sensor 110c sensed the signal before any other sensors 110, the acoustic sensing module 103 can determine that the acoustic signal came from dispensing device 104ax. For this determination, for example, a logic chart for the environment 100, e.g., stored in memory 208, may include logic to reflect the following: If sensor 110c sensed first in time, then dispensing device=dispensing device 104ax.

In some implementations, to more specifically account for the acoustic effects from the environment 100, e.g., echoes, background noises, sounds from other devices/equipment, constructive/destructive interference, in determining which device 104 actuated (or piece of equipment 106, 108 generated an acoustic signal) an acoustic study may be conducted and used to define the environmental or logic map used by the acoustic sensing module 103.

For at least one of the dispensing devices, determining whether a use state of a consumable product in the at least one dispensing device is in a depletion range based on the determined number of actuations (508). In some implementations, this step can be performed by a cloud or offsite system. In some implementations, the acoustic sensing module 103 determines whether a use state of a consumable product in the dispensing device 104 is in a depletion range based on the number of dispensing actuations for the device 104. For example, the memory 208 includes, for each type of dispensing device 104 in the environment 100 and each type of consumable product compatible with the dispensing device 104, a table of the number of actuations for each dispensing device/consumable product combination (e.g., from a full state) until the consumable product is in a depletion range such that the product should be replaced/the dispensing device 104 should be refilled.

In this way, in some implementations, the acoustic sensing module 103 generates and transmits a low consumable product alert for a given dispensing device 104 based on an analysis of a number of determined (e.g., sensed) actuations for the given dispensing device 104 and a number of actuations corresponding to a threshold depletion level or threshold range of the consumable product. Table 1 shows an example depletion threshold/range table stored in the memory 208:

TABLE 1

|  | Product 1 | Product 2 | Product 3 |
|---|---|---|---|
| Dispensing Device A | 200 Actuations | 300 Actuations |  |
| Dispensing Device B | 200 Actuations |  |  |
| Dispensing Device C |  |  | 250 Actuations |

Table 1 shows that Product 1 (e.g., a small hand towel roll) is compatible with Dispensing Devices A and B and, for each, the depletion range will be reached after 200 actuations. Product 2 (e.g., a larger hand towel roll) is only compatible with Dispensing Device B and the depletion range will be reached after 300 actuations. Lastly, Product 3 (e.g., a liquid hand cleaner container) is only compatible with Dispensing Device C and the depletion range will be reached after 250 actuations. For example, the number of actuations in Table 1 can be set such that ten percent of the product remains after reaching the listed depletion range so that Product 1 will be fully depleted (e.g., Dispenser Devices A and B will be empty) at 220 actuations, Product 2 will be fully depleted (e.g., Dispenser Device A will be empty) at 330 actuations, and Product 3 will be fully depleted (e.g., Dispenser Device C will be empty) at 275 actuations.

The depletion range for a dispenser device/consumable product is a state in which the amount of consumable product left is below a threshold amount, as compared to its full amount (e.g., its pre-use amount). For example, the depletion range can be when less than twenty, ten, or five percent of the full amount is available to be dispensed in the device 104. The depletion range can be selected with the maintenance schedule for the environment 100 known to prevent or reduce the likelihood of the dispensing device 104 from running out of product before the next maintenance visit. Or the dispensing device 104 entering a depletion range can be a trigger to an alert to the maintenance system/personnel that a refill is needed, as described below.

The depletion range, by way of example for a hand towel roll, can be determined based on the starting length of the hand towel roll and the length of roll dispensed during a dispensing process. For example, for a hand towel roll with a starting length of 500 feet and a dispense length of ten inches during each actuation, the number of actuations to completely exhaust the roll is 600 ((500 feet*12 inches/per foot)/10 inches). The depletion range can be set such that it occurs with a predetermined amount of towel remaining, for example, at 550 actuations so that 50 actuations remain to allow time and opportunity to refill the dispensing device 104.

In response to determining the at least one dispensing device is in the depletion range, generate a depletion alert (510). In some implementations, the acoustic sensing module 103 determines a dispensing device 104 is in the depletion range and, in response, generates a depletion alert. For example, as described above, the acoustic sensing module 103 generates and sends, based on preprogrammed instructions, a text or instant message communication to environment maintenance personnel or sends, e.g., via LAN or WAN, an alert condition to a data processing apparatus, which, in response, can present such an alert condition to a user through a user interface, e.g., a graphical user interface/dashboard, and/or can create (and/or send) servicing messages to environment maintenance personnel for action. In some implementations, the depletion alert is generated based on a template stored in memory 208. For example, the alert may state: "Mr. Smith—Dispenser XYZ on the fourth floor of Big Building needs to be refilled."

In some implementations, the acoustic sensing module 103 can generate predictions of when each of the dispensers will reach the depletion range and/or be completely empty. For example, the acoustic sensing module 103 can predict, e.g., through time-series algorithms and the like, product depletion based on known amounts of the product remaining at various times, e.g., the time-rate of use/depletion. From this information the acoustic sensing module 103 can generate and transmit alerts to notify appropriate personnel of the expected depletion date. For example, if the acoustic sensing module 103 recorded a full product state on Jan. 1, 2015 (e.g., just after a refill), a 75% product state, i.e., 75% of the product remaining, on Feb. 1, 2015, a 50% product state, on Mar. 1, 2015, and a 25% product state on Mar. 1, 2015, then through, for example, curve fitting and/or extrapolation, the acoustic sensing module 103 can forecast that the product will be fully depleted on Apr. 1, 2015, and send an alert accordingly.

In some implementations, the acoustic sensing module 103 can sense an acoustic signal indicative of a dispensing device 104 actuating without dispensing a consumable product, and, in turn, generate and transmit an alert to have the product refilled. For example, in addition or alternative to the determining a product refill is needed based on actuation counts, the acoustic sensing module 103 can sense an acoustic signal indicative of a dispensing device 104 trying to dispense without any product remaining (e.g., it is empty). Upon such an event, the acoustic sensing module 103 can generate and transmit a low consumable product alert or an emergency refill message indicating that the dispensing device 104 is empty.

In some implementations, the acoustic sensing module 103 uses multiple acoustic signals to determine if an environmental event or signal has occurred, e.g., an actuation or maintenance condition. For example, the acoustic sensing module 103 only records that an actuation has occurred if such actuation occurs within a predetermined time from an earlier environmental signal such as, for example, a door opening indicating an occupant is in the environment 100. Or, for example, the acoustic sensing module 103 only records that a hand towel dispensing device 104 actuation occurred if such actuation happens within a predetermined time period from the sensing of an environmental signal indicative of a faucet running, e.g., indicating an occupant is washing her hands—as it would logically follow that the occupant then needs to dry her hands. Such conditional actuation recording/determination can reduce the number of false actuation determinations by the system 102 by requiring a sequence of events to occur in a given time period before determining and/or recording an actuation (or other environmental event) occurred.

Figure 6:
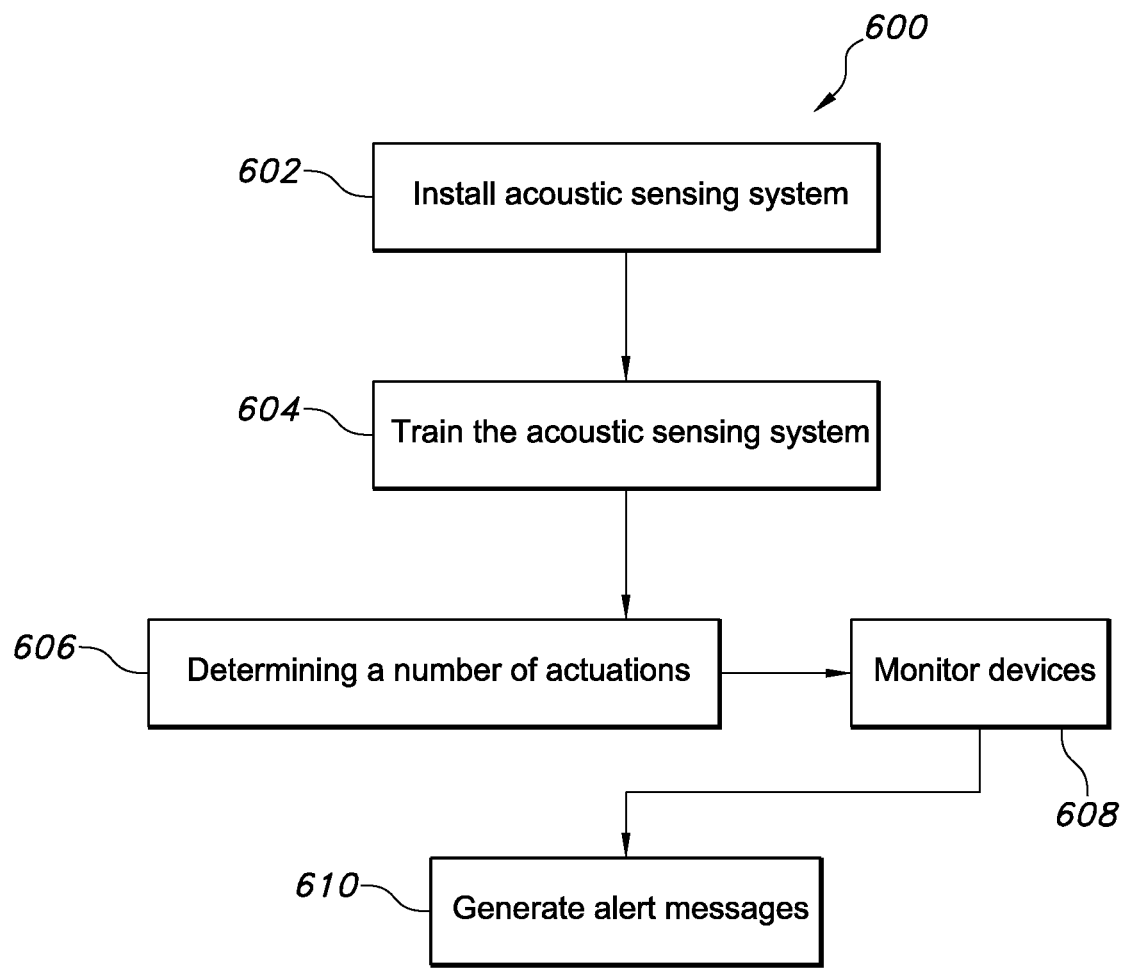
FIG. 6 is a flow chart of an example process for installing an acoustic sensing system.

FIG. 6 is a flow chart of an example process 600 for installing an acoustic sensing system. For example, process 600 can be used to install system 102.

An acoustic sensing module is installed in an environment having existing dispensing devices (602). For example, the acoustic sensing module 103 is installed in a washroom having dispensing devices 104 installed months or years ago, e.g., devices 104 not designed for specific use with the acoustic sensing module 103. In some implementations, the acoustic sensing module 103 is installed on the ceiling or walls of the environment 100 and is powered through the environment's power infrastructure, batteries, or a combination thereof. In some implementations, acoustic sensors 110 are also installed in the environment 100 and configured to communicate and work with the acoustic sensing module 103. As described above, the installation process may involve creating (and storing in memory 208) a map of the environment 100 or a logic chart for use by the module 103 in determining actuations and other environments sounds/signals.

The acoustic sensing module is trained to individually identify the dispensing devices based on acoustic signals generated by actuations of the dispensing devices (604). For example, in some implementations, the acoustic sensing module 103 is seeded with known signatures corresponding to operational sounds of the dispensers 104 and equipment 106, 108, and trained in the environment 100 or through computer modeling (e.g., neural network, regression, k-nearest neighbor, Bayesian networks and/or clustering techniques) to identify the acoustic signals of the dispensers 104 and equipment 106, 108, and account for noise from other devices in the environmental 100, noise from speech (which can be filtered out before processing), and/or other background or unwanted sounds.

The numbers of actuations of the dispensing devices are determined based on the training (606). For example, after installation and training, the acoustic sensing module 103 determines, as described above, the numbers of actuations of the various dispensing devices 104. In some implementations, the acoustic sensing module 103 additionally, or alternatively, identifies other operating conditions in the environment 100, for example, maintenance conditions for equipment 106, 108 such as running toilets and faucets.

The dispensing devices are monitored to determine low consumable product states for the dispensing devices based on the numbers of actuations for the dispensing devices (608). The acoustic sensing module 103 can, for example, as described above, monitor the devices 104 to determine low consumable product states.

Alert messages are generated in response to determined low consumable product states (610). The acoustic sensing module 103 can, for example, as described above, generate alert messages in response to determined low consumable product states.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A system comprising:
    one or more dispensing devices in an environment, each dispensing device having a consumable product storage area and a dispensing mechanism, wherein each dispensing device is configured to store a respective consumable product in the product storage area and to dispense the consumable product through use of the dispensing mechanism to facilitate a hygiene-based process, and wherein actuation of each dispensing device creates an acoustic signal;
    an acoustic sensing module configured to
        (i) sense one or more acoustic signals based on actuation of the one or more dispensing devices,
        (ii) access acoustic signatures corresponding to the one or more acoustic signals,
        (iii) individually identify which of the one or more dispensing devices were actuated based on the sensed one or more acoustic signals and the acoustic signatures,
        (iv) removing any noise captured during sensing of the one or more acoustic signals, and
        (v) detect a door opening event and only sense the one or more acoustic signals within a predetermined time period of the door opening event; and
    a data collection device configured to communicate with the acoustic sensing module to store data identifying the one or more dispensing devices determined to have been actuated.

2. The system of claim 1, wherein the one or more dispensing devices each comprise an acoustic signal generator to generate the acoustic signal in response to actuation of the dispensing mechanism.

3. The system of claim 1, wherein the acoustic signal is an ultrasonic or subsonic signal.

4. The system of claim 1 further comprising a plurality of acoustic sensors configured to be positioned remote from each other, and wherein the acoustic sensing module is configured to determine, on a per dispensing device basis, which of the one or more dispensing devices were actuated based on when in time the sensed one or more acoustic signals were received by various of the plurality of acoustic sensors.

5. The system of claim 1, wherein the acoustic sensing module is configured to sense an acoustic signal indicative of water running and, in response to the acoustic signal occurring continuously for at least a predetermined duration, generate and transmit a maintenance alert.

6. The system of claim 1, wherein the one or more dispensing devices comprise a paper towel dispenser, a bath tissue dispenser or a hand soap dispenser.

7. The system of claim 1, wherein the consumable product comprises paper towels, bath tissue or hand soap.

8. The system of claim 1, wherein the noise is human speech.

9. The system of claim 1, wherein the noise is from other dispensing devices in the environment.

\* \* \* \* \*